June 14, 1960 W. H. MAHANEY 2,941,088

OPTICAL ENCODER

Filed Dec. 10, 1956

Inventor
William H. Mahaney
By: Graf, Nierman & Burmeister
Attorney

United States Patent Office 2,941,088

Patented June 14, 1960

2,941,088

OPTICAL ENCODER

William H. Mahaney, Batavia, Ohio, assignor to The Baldwin Piano Company, Cincinnati, Ohio, a corporation of Ohio Filed Dec. 10, 1956, Ser. No. 627,456

7 Claims. (Cl. 250—233)

The present invention relates generally to analogue to digital encoders.

Optical encoders are commonly used to transform analogue information to digital form. Generally, optical encoders employ a code disc mounted to a rotatable shaft, and the analogue information is impressed upon the rotatable shaft. The code disc is provided with one or more annular tracks of opaque and transparent sectors coaxially disposed about the center of the code disc. A lamp is positioned adjacent to one side of the code disc, and an assembly of photocells confronts the opposite side of the code disc. A radial-defining slit is disposed between the code disc and the photocell assembly to restrict light passing through transparent portions of the code disc to a narrow pattern upon the photocells. By proper positioning of the code disc, and pulsing the lamp with a read-out pulse, a digital output may be obtained from the photocells. More recently, the read-out pulse has been used to actuate the photocells, and the lamp continuously operated.

The slit disposed between the photocell assembly and the code disc of existing optical encoders is employed to define a radial region through which the photocells receive light which is less than one quantum space of the code disc. For present purposes, a quantum space may be considered to be one-half the shortest opaque or transparent sector of the track on the code disc. The use of a slit, however, makes it necessary to place the photocells more remotely from the code disc than would otherwise be required, thereby reducing the dark to light response ratio of the photocells. This space limitation also increases the rise time required for a photocell to produce its steady state output after receiving illumination.

Prior to the present invention, only one other means was known to restrict the area of the beam of light emerging through a transparent quantum of an optical encoder code disc, that is, to reduce the sensitive area of the photocell to less than the area of a quantum on the code disc. However, since there is always a desire to make the code disc small and to resolve as many angles as possible with the code disc, the arc length of a quantum is in most constructions extremely short. As a result, the sensitive area of a photocell for an optical encoder which does not require a radial-defining slit must be very small. It is extremely difficult to construct a photocell with a sensitive area sufficiently small to eliminate the slit of optical encoders.

It is one of the objects of the present invention to provide an optical encoder having a light source, a photocell, and a code disc positioned between the light source and photocell in which the light sensitive area of the photocell is independent of the quantum area of the code disc, and which does not require a slit positioned between the code disc and the photocell.

Optical encoders generally have very small clearances for the code disc since either a slit or a photocell must be positioned close to the code disc. It is a further object of the present invention to provide an optical encoder which may be constructed with substantially greater clearance for the code disc without sacrificing performance.

It is a further object of the present invention to provide an optical encoder with a light source, photocell, and code disc disposed between the light source and photocell having an optical system impressing a magnified image of the code disc on the photocell.

Further objects and advantages of the present invention will become readily apparent from a further reading of this disclosure, particularly when viewed in the light of the drawings, in which.

Figure 1:
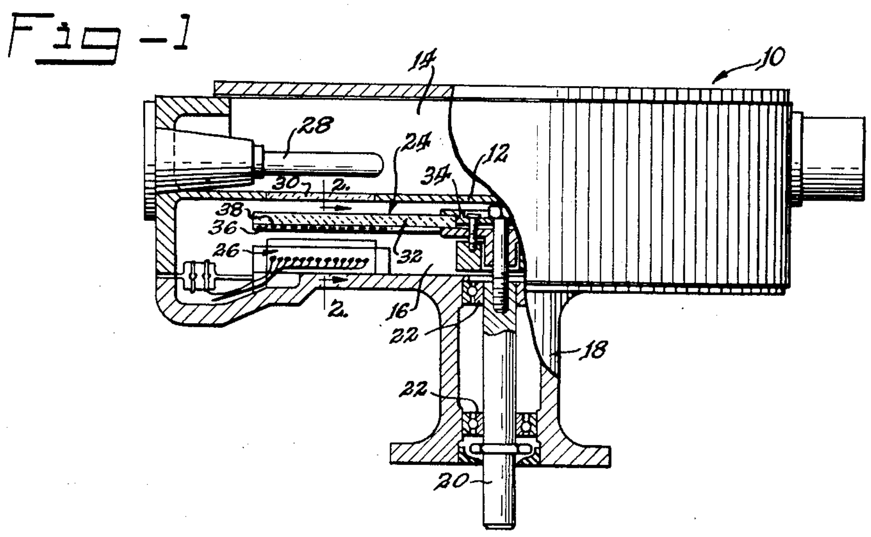
Figure 1 is a view of an optical encoder, partly in section and partly in elevation, constructed according to the teachings of the present invention.
Figure 2:
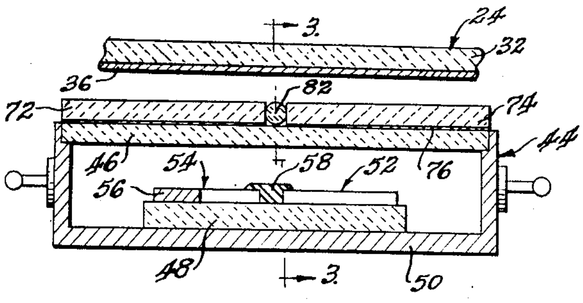
Figure 2 is an enlarged fragmentary sectional view taken along the line 2—2 of Figure 1.
Figure 3:
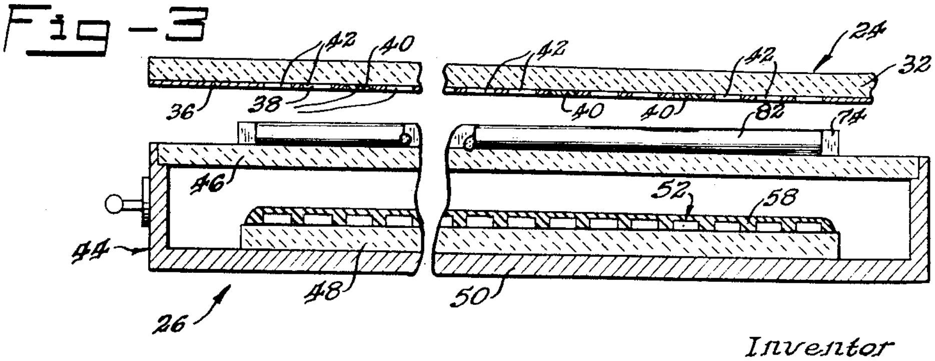
Figure 3 is a sectional view taken along the line 3—3 of Figure 2 illustrating the photocell assembly and lens of the encoder.

As illustrated in Figure 1, the optical encoder employs a housing 10 which is cylindrical in shape and has a partition 12 extending therethrough dividing the housing into two cylindrical compartments 14 and 16. An axial hub 18 extends outwardly from the compartment 16, and a shaft 20 protrudes from the hub 18. The shaft 20 is journaled in bearings 22 within the hub 18, and a code disc 24 is secured to the shaft 20 and rotatable therewith within the compartment 16. A photocell assembly 26 is mounted in the compartment 16 adjacent to the code disc 24 on the side thereof opposite to the partition 12. A lamp 28 is mounted in the compartment 14 aligned with a window 30 in the partition 12 and the photocell assembly 26. The housing 10 is a dust tight unit.

The code disc 24 is constructed with a transparent base 32 which is provided with an axial aperture 34. The code disc 24 is secured at its axial aperture to the end of the shaft 20. The base 32 of the code disc 24 may be constructed of any transparent material of suitable mechanical properties, and glass has been found to be particularly suitable. The surface confronting the photocell assembly 26 has a coating 36 of opaque material, and sixteen annular tracks 38 formed of opaque sectors 40 and transparent sectors 42 are disposed in the coating 36 coaxially about the shaft 20.

The photocell assembly 26 has a hollow rectangular housing 44 disposed thereabout. The housing 44 is provided with a transparent cover 46 and forms a hermetical seal about the photocells. A plate 48 of electrically insulating material, in the particular construction glass, is secured to a base 50 of the housing 44, the base 50 being parallel to the transparent cover 46. Two groups of electrodes 52 and 54 are disposed on the surface of the plate 48 opposite to the base plate 50 of the housing 44. The confronting ends of the electrodes in each group 52 and 54 are equally spaced from a common axis, and each electrode confronts an electrode of the other group. The electrodes in group 54 are constructed integrally and extend outwardly from a common bar portion 56. A ribbon 58 of photoconductive material extends between the confronting electrodes and in contact therewith. The photocell assembly 26 is mounted to the housing 10 with the common axes between the confronting ends of the two groups of electrodes 52 and 54 disposed normal to the axis of rotation of the code disc 24, so that the sensitive areas of the photocell assembly 26 lie on an axis parallel to a radius of the code disc 24. Also, the sensitive areas of the photocell assembly 26 are defined by the region between each pair of confronting electrodes, and each of these sensitive areas confronts one of the code tracks of the code disc 24.

The transparent housing cover 46 of the housing 44 is employed to mount the lens between the photocell assembly 26 and the code disc 24, although it is to be understood that the invention may be practiced with the lens mounted in some other manner. A pair of spaced strips 72 and 74 are secured parallel to each other to the surface of the plate 46 remote from the photocells by a layer of cement 76. The strips 72 and 74 have parallel confronting surfaces which are aligned with the sensitive areas of the photocells. A cylindrical rod 82 is cemented between the strips 72 and 74 and abuts the transparent cover 46. It is constructed of transparent material, in the particular construction glass. The rod 82 is aligned with the sensitive regions of the photocells of the photocell assembly 26, and hence a radius of the code disc 24. The rod 82 forms a convex lens, and it is disposed at a distance from the code disc 24 between its focal length and twice its focal length. Also, the sensitive regions of the photocell assembly 26 are positioned at a distance from the rod 82 to focus the image of the code disc upon the sensitive regions of the photocell assembly 26. In this manner, a magnified image of the code disc 24 is produced in a plane normal to the axis of elongation of the rod 82, hence enlarging the image of the code disc 24 in a plane aligned with the confronting electrodes of the photocell assembly 26. However, the cylindrical rod 82 provides no magnification of the image of the code disc 24 in a plane parallel to the common axis of the photocells so that the tendency of the image to fall upon more than one sensitive region of the photocell assembly 26 is not increased by the rod 82.

In one particular construction of an encoder according to the teachings of the present invention, the code disc 24 has a glass base 32, 8½ inches in diameter with sixteen tracks 38 with a width of 0.060 inch, the tracks being spaced by 0.040 inch. The outer track on the disc 24 has a diameter of 8 inches and the inner track a diameter of 4.8 inches. The number of angles, or quanta, resolved is 65,536, each quantum representing approximately 20 seconds of arc. There are 16,384 opaque and 16,384 clear lines in the outer track. Each opaque and clear line is equal in width and each is approximately 19.1 microns wide in the outer track. The radial pattern boundaries are at least accurate to one-half of a quantum angle in order to maintain accuracy. A photographic process is employed to place an opaque photographic emulsion for the coating 36 on the glass plate.

The photocell assembly 26, in this construction, employs Inconel electrodes 52 and 54 printed on a glass plate 48 with their confronting ends spaced from each other by a distance of approximately 25 microns. The ribbon 58 is an evaporated film of cadmium selenide. The invention, however, may be practiced with other types of photocells, such as those described in the patent application of William Pong entitled, "Encoder," filed December 31, 1956, Serial No. 631,818, or more common types.

The rod 82 is constructed of glass and has a diameter of 0.8 millimeter. The rod 82 is positioned at 0.010 inch from the code disc 24 as measured from its surface, and the distance from the code disc 24 to the center of the rod 82 is approximately one-fourth of the distance between the center of the rod 82 and the sensitive areas of the photocell assembly 26. As with all convex lenses, a magnified real image is achieved when the object is disposed between the focal length and twice the focal length from the lens, and the magnification of the lens increases as the object is moved nearer to the focal point on the object side of the lens. Also, when using glass for the rod 82, the index of refraction is approximately 1.5 to 1.7, and the focal length is approximately equal to one and one-half times the radius of the rod 82.

As a result of employing a convex lens between the code disc 24 and the photocell assembly 26, more even illumination of the sensitive areas of the photocells is achieved than is readily achieved by employing a slit between the code disc and the photocells. Also, there is more clearance between the code disc and the lens than there is clearance between the code disc and a radial-defining slit in an encoder employing a slit. It is thus clear that a convex lens between a code disc and the sensitive area of a photocell of an optical encoder has advantages over a radial-defining slit between the code disc and photocells.

Further, there are advantages in employing a lens between the code disc and the photocell assembly in an optical encoder over employing only a photocell assembly confronting the code disc, the photocells having restricted light sensitive areas so that no means are required to limit the area of light falling thereon. It is difficult to construct photocells having sufficiently small light sensitive areas to maintain accuracy without a slit, a cross section of the order of 3 microns being required in some high accuracy encoders employing code discs of reasonable size. When employing a convex lens in an optical encoder, according to the teachings of the present invention, the photocells of a comparable encoder may have electrodes spaced by a distance of 25 microns and produce approximately the same results as an encoder employing photocells with electrodes spaced by 3 microns directly confronting the code disc. Also, the convex lens of an encoder of this type may be positioned further from the code disc than the photocells of a comparable encoder employing photocells with narrow electrode spacings directly confronting the code disc. This fact makes it possible to employ a relatively thick cover, such as the cover 46 of the photocell assembly 26, when employing a convex lens, where the cover glass for a photocell assembly which directly confronts the code disc must be extremely thin. Such thin cover glasses have caused difficulty due to cracking as a result of mechanical strains.

The man skilled in the art will readily see many other advantages of the present invention in addition to those set forth. Further, many modifications of the present invention may be devised within the scope of this invention. For example, the present invention may clearly be practiced with means, other than the disc 24, for modulating the light which falls upon the photocell assembly from the light source. Hence, a plate having tracks with opaque and transparent segments other than coaxial, such as rectilinear, for the modulating means is clearly contemplated as within the scope of the invention. It is therefore intended that the scope of the present invention be not limited by the foregoing disclosure but rather only by the appended claims.

The invention claimed is:

1. An encoder comprising, in combination: a photocell assembly having a base plate constructed of electrically insulating material, a plurality of pairs of electrodes having spaced confronting portions disposed adjacent to each other on one surface of the base plate, the electrodes in each pair being disposed on opposite sides of a common axis, and a ribbon of photoconductive material disposed in contact with the electrodes along the common axis between the electrodes; a light source confronting the space between each pair of electrodes; a rotatable code disc having a plurailty of coaxial tracks of opaque and transparent sectors disposed thereabout, one track being aligned between each pair of electrodes and the light source; a transparent plate mounted between the photocell assembly and the code disc; a pair of parallel spaced strips secured to the surface of the plate remote from the photocell assembly, the confronting surfaces of said strips being aligned with the light source and confronting portions of the electrodes of the photocell assembly; and a cylindrical glass rod disposed between the strips and abutting the confronting surfaces of the strips, said rod forming a convex lens and being disposed between its focal length and twice its focal length from the code disc.

2. An encoder comprising, in combination: a photocell assembly having a housing with a transparent wall, a plurality of photocells disposed within the housing having sensitive areas disposed on a common axis and confronting the transparent wall, said photocells including a base plate constructed of electrically insulating material, a pair of electrodes disposed on one surface of the plate having confronting portions spaced from each other, and a layer of photoconductive material disposed between the electrodes; a light source confronting the photocells; a code disc disposed to rotate between the light source and photocells on an axis normally intersecting the common axis of the photocells, said code disc having a track disposed coaxially thereon confronting each photocell having a plurality of opaque and transparent sectors; a pair of parallel spaced strips secured to the surface of the transparent wall of the housing remote from the photocells, the confronting surfaces of said strips being aligned with the light source and confronting portions of the electrodes of the photocell assembly; and a cylindrical glass rod disposed between the strips and abutting the confronting surfaces of the strips, said rod forming a convex lens and being disposed between its focal length and twice its focal length from the code disc.

3. An encoder comprising, in combination: a photocell assembly having an airtight housing with a transparent plate, a plurality of pairs of electrodes having spaced confronting portions disposed adjacent to each other, the electrodes of each pair being disposed on opposite sides of a common axis, and a mass of photoconductive material disposed between each pair of electrodes; a light source confronting the transparent plate of the housing; a code disc having a plurality of coaxial tracks of opaque and transparent sectors disposed thereabout rotatably mounted between the light source and photocell assembly, one track being aligned with each pair of electrodes and the light source; and an elongated transparent rod mounted on the plate and aligned with the common axis of the electrodes, said rod forming a convex lens and being disposed between its focal length and twice its focal length from the code disc.

4. An encoder comprising the elements of claim 3 wherein the surface of the plate confronting the rod is provided with a coating of a light impermeable material, the coating having an elongated aperture confronting the rod.

5. A photocell assembly comprising an airtight housing having a transparent plate, a plurality of pairs of electrodes having spaced confronting portions disposed adjacent to each other, the electrodes of each pair being disposed on opposite sides of a common axis, a mass of photoconductive material disposed between each pair of electrodes, and an elongated transparent rod mounted on the plate and aligned with the common axis of the electrodes, said rod forming a convex lens.

6. An encoder comprising, in combination, a plurality of photocells having sensitive areas disposed on a common axis, an elongated light source confronting the photocells, a code disc disposed between the light source and the photocells rotatable on an axis normally intersecting the common axis of the photocells, said code disc having a coaxial track of transparent and opaque sectors confronting each photocell, a transparent plate disposed between the photocells and the light source generally parallel to the code disc, a pair of parallel spaced strips secured to the surface of the transparent plate confronting the code disc, the confronting surfaces of the strips being aligned with the light source and the common axis of the photocells, and a transparent rod disposed between the strips and abutting the confronting surfaces of the strips, said rod forming a convex lens and being disposed at a distance from the code disc approximately equal to its focal length.

7. An encoder comprising the elements of claim 6 wherein the surface of the transparent plate confronting the rod is provided with a coating of light impermeable material, and the coating is provided with an elongated aperture confronting the lens.

References Cited in the file of this patent

UNITED STATES PATENTS

| | | |
|---|---|---|
| 2,169,842 | Kannenberg | Aug. 15, 1939 |
| 2,341,934 | Martin | Feb. 15, 1944 |
| 2,436,178 | Rajchman | Feb. 17, 1948 |
| 2,586,609 | Burke | Feb. 19, 1952 |
| 2,641,158 | Sweet | June 9, 1953 |
| 2,768,310 | Kazan et al. | Oct. 23, 1956 |
| 2,784,397 | Branson et al. | Mar. 5, 1957 |

FOREIGN PATENTS

| | | |
|---|---|---|
| 616,831 | Great Britain | Jan. 27, 1949 |